US012564750B2

(12) United States Patent
    Stupak

(10) Patent No.: US 12,564,750 B2
(45) Date of Patent: Mar. 3, 2026

(54) DEVICE FOR ABSORBING AND DISSIPATING THE ENERGY OF A DROPPED OR THROWN OBJECT

(71) Applicant: Peter Stupak, Lebanon, NJ (US)

(72) Inventor: Peter Stupak, Lebanon, NJ (US)

( * ) Notice: Subject to any disclaimer, the term of this patent is extended or adjusted under 35 U.S.C. 154(b) by 385 days.

(21) Appl. No.: 18/204,620

(22) Filed: Jun. 1, 2023

(65) Prior Publication Data

US 2024/0399186 A1       Dec. 5, 2024

(51) Int. Cl.
    *A63B 6/00*        (2006.01)
    *F16F 1/36*        (2006.01)
    *F16F 1/371*       (2006.01)
    *F16F 1/42*        (2006.01)
(52) U.S. Cl.
    CPC .............. *A63B 6/00* (2013.01); *F16F 1/3605* (2013.01); *F16F 1/3713* (2013.01); *F16F 1/424* (2013.01); *F16F 2230/0023* (2013.01); *F16F 2236/022* (2013.01)
(58) Field of Classification Search
    None
    See application file for complete search history.

(56) References Cited

U.S. PATENT DOCUMENTS

| 3,518,707 | A  | 7/1970  | Nissen         |
| 3,892,401 | A  | 7/1975  | Sorerson       |
| 4,137,583 | A  | 2/1979  | Baldwin et al. |
| 8,573,125 | B1 | 11/2013 | Rossow et al.  |

FOREIGN PATENT DOCUMENTS

| CN | 217079633 | U | * | 7/2022  |                    |
| CN | 217151335 | U | * | 8/2022  |                    |
| CN | 115030538 | A | * | 9/2022  | ......... E04G 21/3204 |
| CN | 115142698 | A | * | 10/2022 | ............ F16F 15/067 |
| CN | 218529714 | U | * | 2/2023  |                    |

(Continued)

OTHER PUBLICATIONS

CN115030538A: English Machine Translation (Year: 2022).*

(Continued)

*Primary Examiner* — Melanie Torres Williams
(74) *Attorney, Agent, or Firm* — Thomas. J. Germinario

(57)                ABSTRACT

A device for absorbing and dissipating the energy of a dropped or thrown object is disclosed. The device includes a flexible planar layer (mesh layer), energy absorbing and dissipating elements (ligatures), a frame, and a void-space between the mesh layer and the supporting surface where the frame rests, for example, a floor, foundation, or wall. The mesh layer is connected to the frame by energy absorbing and dissipating ligatures. The falling or thrown weight contacts and deflects the mesh layer, causing the ligatures to elongate in tension and absorb and dissipate a portion of the kinetic energy of the weight. Also, the friction between the deforming elements of the mesh layer contributes to the kinetic energy dissipation. The remaining kinetic energy is transferred to the frame and the supporting surface. The void-space allows the falling weight in contact with the mesh layer to decelerate over a greater distance and time, thereby reducing the total dynamic force applied to the frame and the surface on which the frame rests.

9 Claims, 13 Drawing Sheets

(56)          References Cited

FOREIGN PATENT DOCUMENTS

CN          218912347  U   *   4/2023
JP          2004034445  A   *   2/2004

OTHER PUBLICATIONS

JP-2004034445-A: English Machine Translation (Year: 2004).*
CN-115142698-A: English Machine Translation (Year: 2022).*
CN-217079633-U: English Machine Translation (Year: 2022).*
CN-218912347-U: English Machine Translation (Year: 2023).*
CN-218529714-U: English Machine Translation (Year: 2023).*
CN-217151335-U: English Machine Translation (Year: 2022).*

* cited by examiner

DEVICE FOR ABSORBING AND DISSIPATING THE ENERGY OF A DROPPED OR THROWN OBJECT

FIELD OF INVENTION

The present invention relates to devices for absorbing and dissipating the energy of a dropped or thrown object. More particularly, the present invention relates to a device comprising a mesh layer, energy absorbing and dissipating ligatures, a frame, and a void-space between the mesh layer and the surface on which the frame rests for reducing impact force and sound and vibration transmission caused by falling weights.

BACKGROUND OF THE INVENTION

In various environments, such as home gyms, commercial gyms, and fitness settings, the impact of falling weights can cause damage to floors and foundations, and generate significant noise and vibration, which can be disturbing and inconvenient for neighbors, both in residential and commercial spaces. Conventional solutions, such as rubber or foam gym mats, may not provide adequate protection or noise reduction because of large forces developed from the high deceleration of the falling weights directly impacting the mats. The high deceleration results from the short stopping distances and the brief stopping times of the weight during impact on conventional gym mats. High decelerations cause excessive kinetic energy and forces to be transmitted to the floor, foundation, or wall, resulting in unacceptable "booming" sound and vibration and possible damage. Additionally, the large resulting forces and inadequate energy dissipation can result in a dangerous bounce of the weights upon impact.

In residential settings, noise and vibration transmission can disturb neighbors residing below, adjacent to, above, or within the gym area. Such disturbances can lead to complaints and conflicts, creating an uncomfortable living environment for all parties involved. Additionally, falling weights can cause damage to floors and structural components, especially when performing exercises like weightlifting using dumbbells, kettle bells, barbells, CrossFit, or high-intensity interval training (HIIT) exercises that may involve dropping or throwing weights.

Commercial gyms often seek affordable rental spaces, such as second-floor locations in malls or other commercial buildings. In these environments, noise and vibration transmission can be particularly problematic where excessive noise and vibration can disrupt business operations in retail spaces located below or adjacent to the commercial gym, causing discomfort to customers and potentially leading to lost revenue. Furthermore, the structural integrity of ceilings in the retail spaces located below the commercial gym may be compromised, resulting in cracked or displaced ceiling tiles and costly repairs.

Wall-mounted impact situations, such as the use of medicine balls or wall balls, can also generate significant noise and vibration, causing disturbances and potential damage to walls and structural components. Conventional wall padding may not provide sufficient impact protection, leading to costly repairs or replacements.

In both residential and commercial gym settings, the bounce of weights upon impact with a conventional gym mat can pose safety hazards to users, as the rebounding weight can cause injuries or damage to equipment or surroundings. Reducing the bounce of weights is crucial for providing a safer training environment.

There is a need for a device that effectively absorbs and dissipates the energy of a dropped or thrown weight that reduces the impact force, minimizes the transmission of sound and vibration, provides adequate floor and wall protection, and improves user safety by reducing the bounce of weights. The present invention addresses these needs by providing a device that includes a mesh layer connected to a frame by energy absorbing and dissipating ligatures, a frame, with a void space between the mesh layer and the surface on which the frame rests. The invention is suitable for use in environments requiring reduced impact force and sound transmission, such as home gyms, commercial gyms, and fitness settings and other environments where impact is present.

SUMMARY OF THE INVENTION

The present invention provides a device for absorbing and dissipating the energy of a dropped or thrown object. The device includes a flexible planar layer (mesh layer), energy absorbing and dissipating elements (ligatures), a frame, and a void-space between mesh layer and the supporting surface where the frame rests, for example, a floor, foundation, or wall. The mesh layer is connected to a frame by energy absorbing and dissipating ligatures. The falling or thrown weight contacts and deflects the mesh layer, causing the ligatures to elongate in tension and absorb and dissipate a portion of the kinetic energy of the weight. Friction between the deforming elements of the mesh layer contributes to the kinetic energy dissipation. The remaining kinetic energy is transferred to the frame and the supporting surface. The void-space allows the falling weight to decelerate over a greater distance and time, thereby reducing the total dynamic force applied to the frame and the supporting surface on which the frame rests. The frame contact area is large, distributing the reduced impact force over a greater physical contact area, contributing to greatly reduced sound transmission. The device prevents the weight and supporting mesh layer from directly contacting the supporting surface. The frame can be shaped to reduce the distance between the opposite sides of the frame and thereby reduce the deflection of the mesh layer. Various shapes can be used, including a "Figure-8", oval, rectangle, polygon, circle, etc., and the deflection of the flexible planar layer can be further controlled by the type, number, distribution, and tension of the ligatures.

Underlying the operation of the present invention are physical principles based on the Work-Energy Theorem and the Impulse-Momentum Theorem. The inventive device reduces impact force by allowing a falling or thrown weight to decelerate over a longer distance and time, facilitated by the deflection of the mesh layer into the void space between the layer and the supporting surface.

According to the Work-Energy Theorem, the change in kinetic energy ($\Delta KE$) during impact, from a maximum at the initial contact of the falling or thrown weight with the mesh layer to zero at the lowest deflection point, equals the work (W) exerted on the weight by the device, defined as the dynamic force ($F_{dyn}$) multiplied by the deflection distance (d) (Equations 1 and 2):

$$\text{Work} = \text{Change in Kinetic Energy} \tag{1}$$

$$F_{dyn} * d = \Delta KE \tag{2}$$

Since the change in kinetic energy is determined and fixed by the drop height or thrown trajectory, a longer deflection distance (longer d) of the mesh layer and weight into the void space of the device necessarily results in a reduced dynamic force on the weight and the dynamic force transmitted to the supporting surface through the frame (Equation 3):

$$F_{dyn} = \frac{\Delta KE}{d} \qquad (3)$$

Note that the dynamic force on the weight and the device are equal and opposite and are maximum at the lowest point of deflection of the weight and mesh layer when the weight reaches the maximum deceleration just as it momentarily comes to rest.

Similarly, the Impulse-Momentum theorem states that the change in momentum of an impacting object (ΔP) is equal to the Impulse, which is defined as the average impact force ($F_{ave}$), multiplied by the impact time (ΔT) (Equations 4 and 5).

$$\text{Impulse} = \text{Change in Momentum} \qquad (4)$$

$$F_{ave} * \Delta t = \Delta P \qquad (5)$$

Since the change in momentum is determined and fixed by the mass and velocity of the falling or thrown weight, the longer impact time (longer Δt) provided by the device also necessarily results in a lower average impact force (Equation 6):

$$F_{ave} = \frac{\Delta P}{\Delta t} \qquad (6)$$

Familiar applications of these principles are the examples of the foam inserts that protect fragile products during shipping and the automobile "air bag" that reduces the impact force to passengers during a collision. In both applications, the impact distance and time are increased, resulting in a lower transmitted force.

Crucially, the present invention is not a fully elastic system, where the elastic ligatures would elongate and contract without energy dissipation, temporarily storing a portion of the impact energy as elastic strain energy that would be returned upon contraction and cause the weight to bounce. Instead, the invention provides energy dissipation through the elongation and contraction of ligatures with internal energy dissipating mechanisms and friction within the flexible planar mesh layer's components.

Preferably, the ligatures are composed of viscoelastic materials that dissipate stored strain energy through internal friction mechanisms, converting a portion of the kinetic energy of the falling or thrown weight into waste heat. FIGS. 1 and 2 depict force-elongation curves for the tensile elongation and contraction of a fully elastic ligature (FIG. 1) and a viscoelastic ligature (FIG. 2). The elastic ligature's force-elongation curve follows the same path during elongation and contraction, dissipating no energy. In contrast, the viscoelastic ligature's force-elongation curve differs between elongation and contraction. Internal frictional mechanisms within the ligature material operate during elongation, dissipating strain energy as waste heat, so that upon contraction, the force-elongation curve of the ligature follows a lower path and dissipates energy still further. The area between the elongation and contraction curves represents the dissipated energy, a phenomenon termed "hysteresis."

The benefits of high hysteresis achieved by using viscoelastic ligatures in the present invention include: 1) significantly reduced kinetic energy transmitted to the frame and supporting surface, 2) further lowering the resulting transmitted force, and 3) significantly reduced bounce of the weight, as only a minimal amount of energy remains stored as elastic strain energy (FIG. 3). As shown in FIG. 3, the viscoelastic ligature exhibits a lesser maximum acceleration during impact and both a 50% reduction in "bounce" as well as no follow-on bounces or "ringing" as observed for the fully elastic ligature.

In summary, the present invention provides a device for absorbing and dissipating the energy of a dropped or thrown weight, that effectively mitigates the impact force, minimizes sound and vibration transmission, protects floors and walls, and improves user safety by reducing weight bounce. The inventive device achieves these objectives through a combination of a mesh layer connected to a frame by energy-absorbing and dissipating ligatures, a frame, and a void space between the mesh layer and the supporting surface, for example a floor, foundation, or wall. The inventive device is particularly suitable for use in environments requiring reduced impact force and sound transmission, such as home gyms, commercial gyms, fitness settings, and other impact-related environments. The use of viscoelastic ligatures within the device ensures that a substantial portion of the stored elastic strain energy is dissipated, resulting in further benefits such as lower transmitted force and reduced weight bounce.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

DETAILED DESCRIPTION OF THE PREFERRED EMBODIMENT

Figure 1:
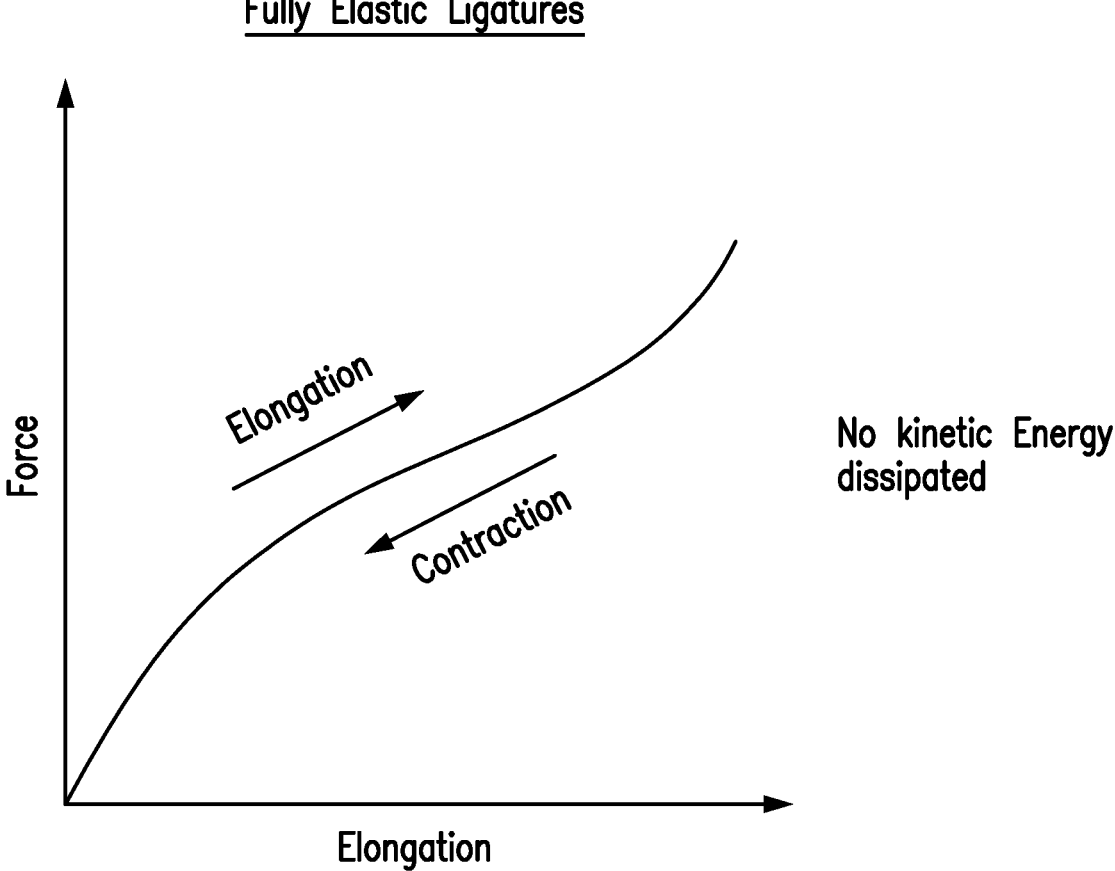
FIG. 1 is a schematic of a force-elongation curve for a fully elastic ligature.

Referring to FIGS. 4-7, the device 10 for absorbing and dissipating the energy of a dropped or thrown object includes a flexible planar layer (mesh layer) 12, a frame 14 supporting the mesh layer 12, energy absorbing and dissipating elements (ligatures) 16 connecting the mesh layer 12 to the frame 14, and a void space 18 between the mesh layer 12 and a surface 20 on which the frame 14 rests, for example a floor, foundation, or wall.

The mesh layer 12 is directly impacted and deflected downwards by the falling or thrown weight and transfers a portion of the kinetic energy and the impact force to the frame 14 through the ligatures 16. Friction between the deforming components of the mesh layer 12 contributes to the kinetic energy dissipation. The mesh layer 12 may be woven or non-woven, and made from strong, tough, abrasion resistant, and flexible materials including, but not limited to, woven nylon webbing, aramid fiber cloth, woven rope, non-woven polyester, nylon, or polypropylene, and metallic fabrics of steel or aluminum mesh. In some embodiments, the mesh layer 12 may include a textured or coated surface for enhanced friction between the weavings of the mesh layer 12 to increase frictional energy dissipation of the falling weight.

The ligatures 16 elongate in tension when the mesh layer 12 is deflected by a falling or thrown weight. Tensile deformation increases the efficiency of energy absorption and dissipation, since the full volume of the material is deformed, and multiple ligatures are activated. In contrast, current commercial gym mats made of rubber and foam are used in compression, which only deforms a small volume of material directly under and immediately adjacent to the weight.

Preferably, the ligatures 16 are composed of viscoelastic materials that dissipate stored strain energy through internal friction mechanisms, converting a portion of the kinetic energy of the falling or thrown weight into waste heat.

The ligatures 16 can be made of various materials, such as a range of filled and unfilled rubber (e.g., butyl, polyisoprene, etc), polyurethane, Sorbothane, and thermoplastic elastomers or other suitable materials with energy absorbing and dissipating properties. In one embodiment, paraffin was diffused into cured butyl rubber at 100° C. resulting in a 50% reduction of rebound or bounce and no "ringing" after the first rebound, compared to untreated butyl rubber. Further, the diffusion time and paraffin molecular weight could be controlled to tailor the energy dissipation during an impact cycle.

Figure 11:
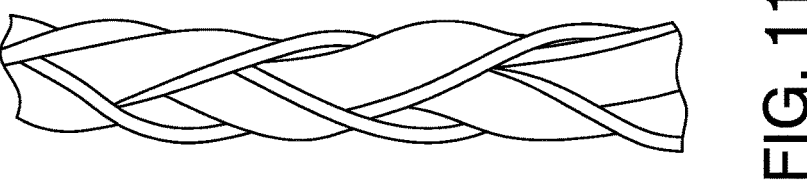
FIG. 11 is a detail view of a braided ligature.

The ligatures 16 can be made in various shapes, configurations, and combinations of configurations, including, but not limited to single strands of material, braided strands (FIG. 11), loops, or a semi-continuous, or a continuous element that serves many attachment points. The ligatures 16 can be attached to the mesh layer 12 by various mesh connections 13, comprising direct attachment by knots or weaving, S-hooks, D-Rings, eyelets, grommets, and/or hook-and-loop straps. The ligatures 16 can be attached to the frame 14 by multiple perimeter connectors 15, comprising bolts, screws, rivets, clamps, snaps, hook-and-loop straps, and/or adhesives. The ligatures 16 can also be directly attached to the frame 14 by multiple perimeter connectors 15, comprising apertures, notches, grooves, channels, flanges and/or protrusions of the frame 14.

Different embodiments of the device 10 will potentially use different types, numbers, and distributions of ligatures 16 to control the amount of deflection of the mesh layer 12 and minimize the rebound or "bounce" of the weight depending on the weight, drop height, or thrown trajectory range anticipated. A greater number and greater local concentration of ligatures 16, may be required for heavier weights, larger drop heights, or thrown trajectories for a particular frame geometry.

In some embodiments, the ligatures 16 may have adjustable tension, allowing the user to control the deflection of the mesh layer 12 and further tailor the performance of the device 10 to specific weight ranges, impact drop heights, or thrown trajectories. Greater tension in the ligatures 16 creates greater tension in the mesh layer 12 and reduces the deflection for a given weight, drop height, or thrown trajectory. As depicted in FIGS. 9A-9E, various methods, and combinations of methods, to adjust the tension comprise adjustable hooks and eyes, adjustable clamps, adjustable screws, adjustable tension cables, adjustable loop and pins, and adjustable hook-and-loop straps.

Figure 7:
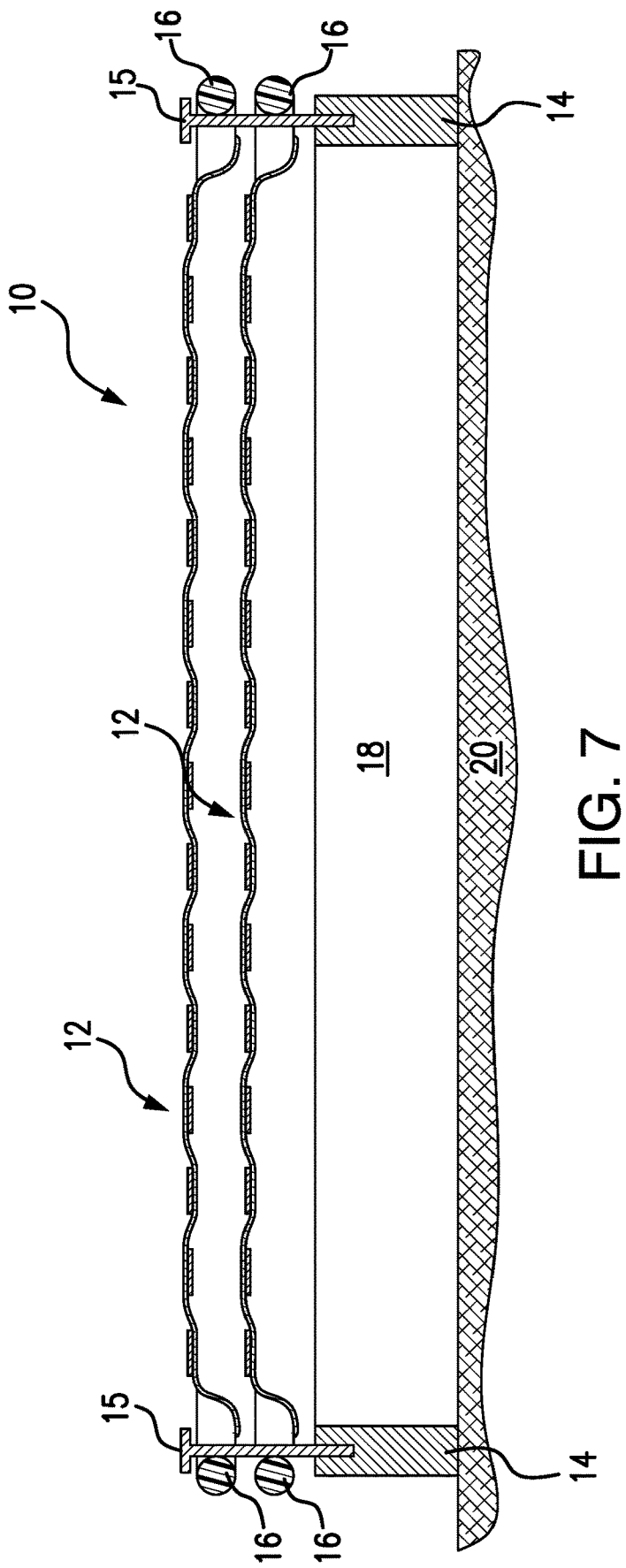
FIG. 7 is a cross-sectional view of the device in FIG. 6, along the line B-B', showing an embodiment with two mesh layers, one above the other.
Figure 12:
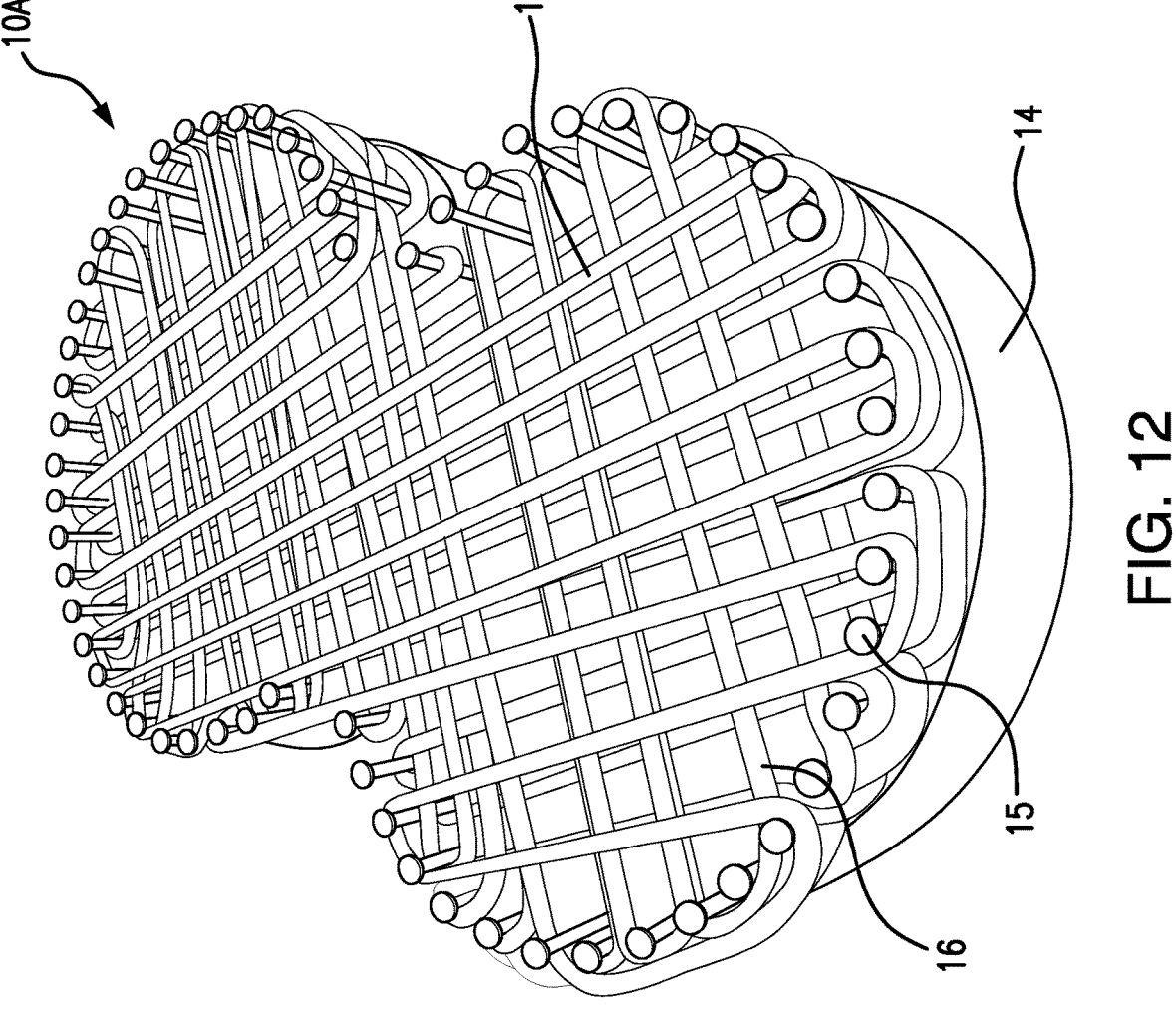
FIG. 12 is a perspective view of an embodiment in which the ligatures span the entire side-to-side length of the frame and serve functionally as both the ligatures and the mesh layer.

The length, number, and distribution of ligatures 16 can be varied according to the specific application conditions. As depicted in FIG. 12, one embodiment 10A uses ligatures 16 that span the entire distance from one side of the frame 14 to the other in various configurations, number, distribution, and tension. Alternatively, it is possible to use a single continuous ligature 16 to create a woven configuration. In both of these embodiments, the ligatures 16 become the functional mesh layer 12. In another embodiment 10C, as shown in FIG. 7, multiple mesh layers 12 may be used and attached to the frame 14 using independent ligatures or the same ligatures 16.

The frame 14 provides support for the mesh layer 12 and transfers the remaining portion of the kinetic energy and the reduced impact force to the surface 20 on which the frame rests. The frame 14 can be made of various materials, including but not limited to, steel, aluminum, titanium, magnesium, and other metals, polycarbonate, ABS, polypropylene, and other polymer materials, class and carbon fiber composite materials, cellular and honeycomb materials, and natural materials, including wood and bamboo, depending on the weight, drop height, or thrown trajectory range required. The frame 14 using these, and other materials can be fabricated by welding, casting, extrusion, injection molding, compression molding, and cutting, shaping, and molding.

The frame 14 height and width can be designed to be greater or lesser depending on the weight, drop height, and thrown trajectory range. Greater weights, higher drop heights, and more aggressive thrown trajectories typically require a higher and thicker frame to withstand the kinetic energy and forces generated in the frame 14, spread the reduced impact force over a greater surface area, and to prevent the weight and the mesh layer 12 from contacting the floor.

Figures 8A, 8B, 8C, 8D, 8E, 8F, 8G:
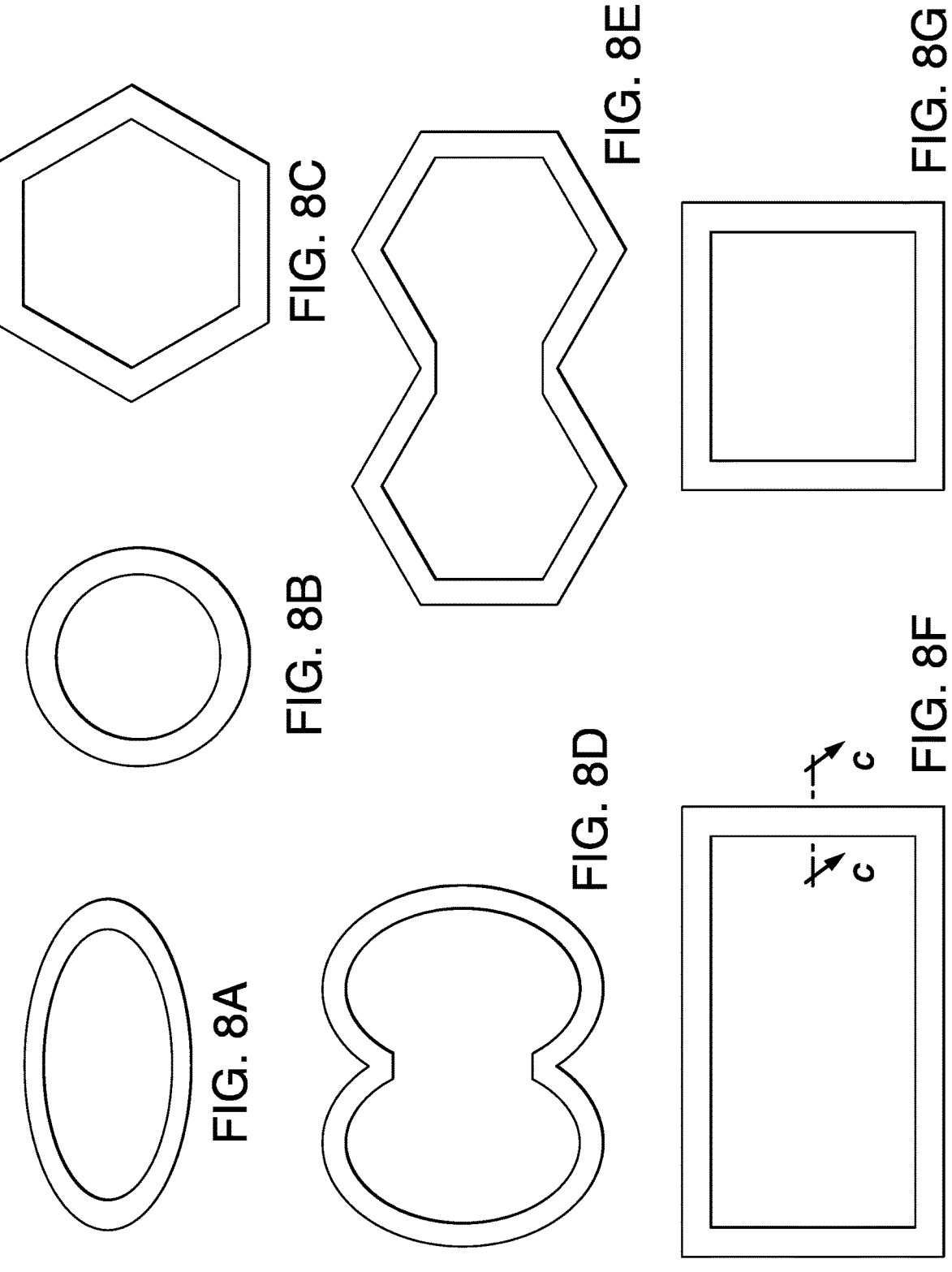
FIGS. 8A-8G depict top plan views of frame shapes consisting of ellipse, circle, hexagon, elliptical figure-8, hexagonal figure-8, rectangle, and square, respectively.
Figure 9C:
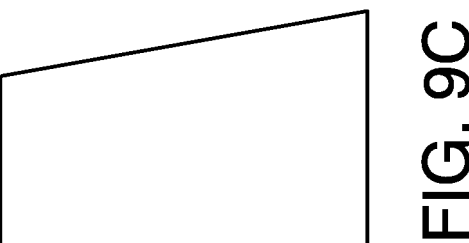
FIGS. 9A-9E depict cross-sectional views of the frame in FIG. 8F, along the line C-C′ consisting of rectangular, trapezoidal, semi-trapezoidal, hyperbolic, and semi-hyperbolic, respectively.
Figure 9B:
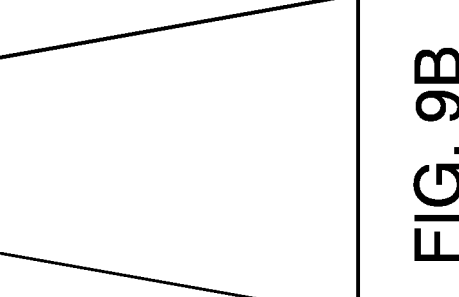
Figure 9A:
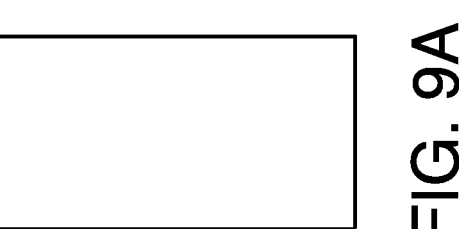
Figure 9E:
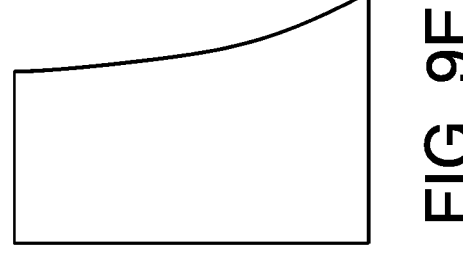
Figure 9D:
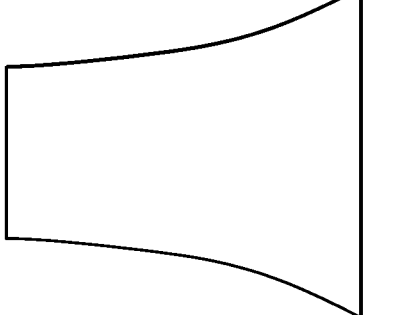
Figure 10A:
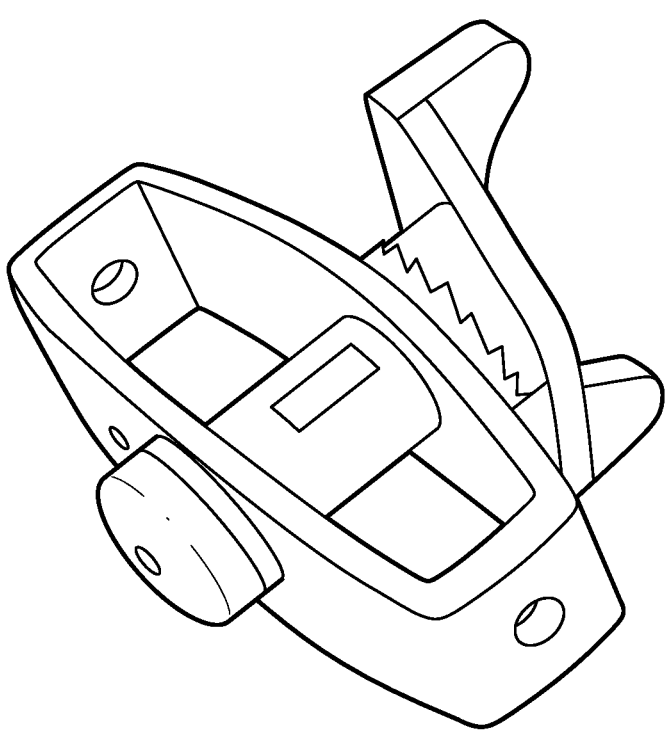
FIGS. 10A-10E depict examples of adjustable perimeter connectors.
Figure 10B:
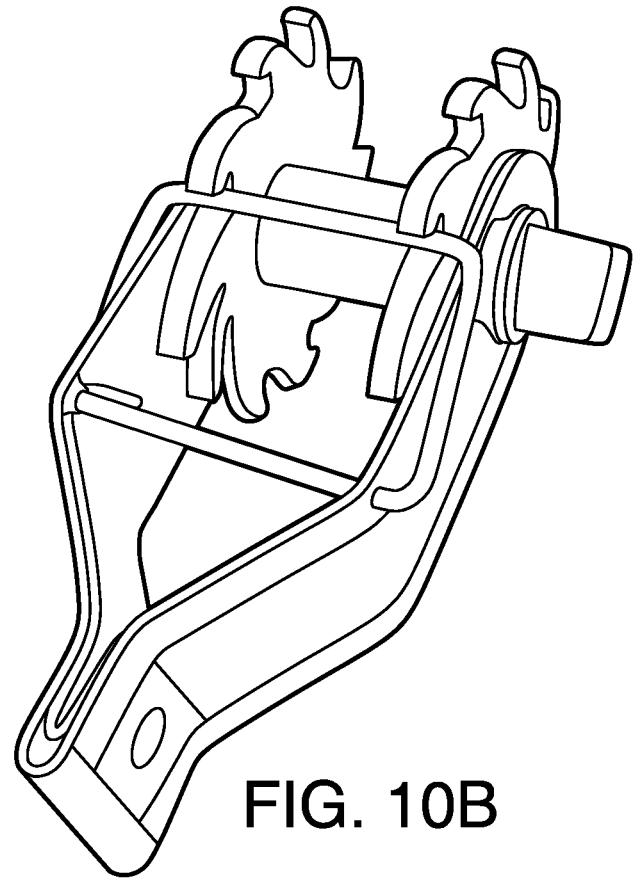
Figure 10C:
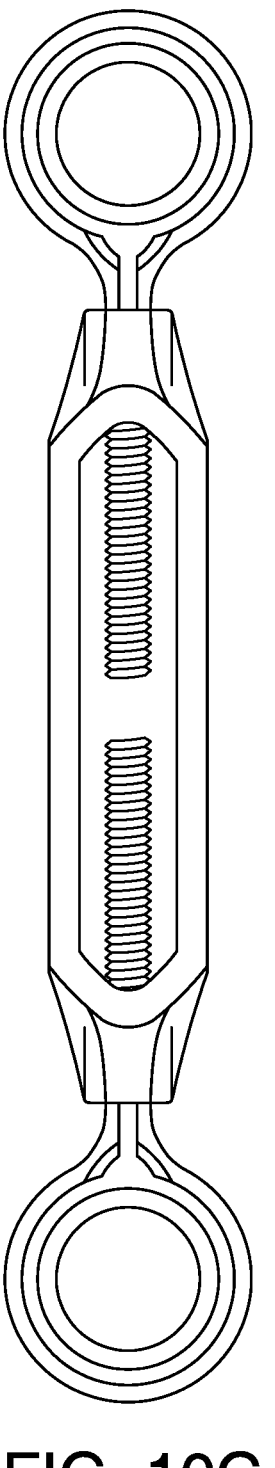
Figure 10D:
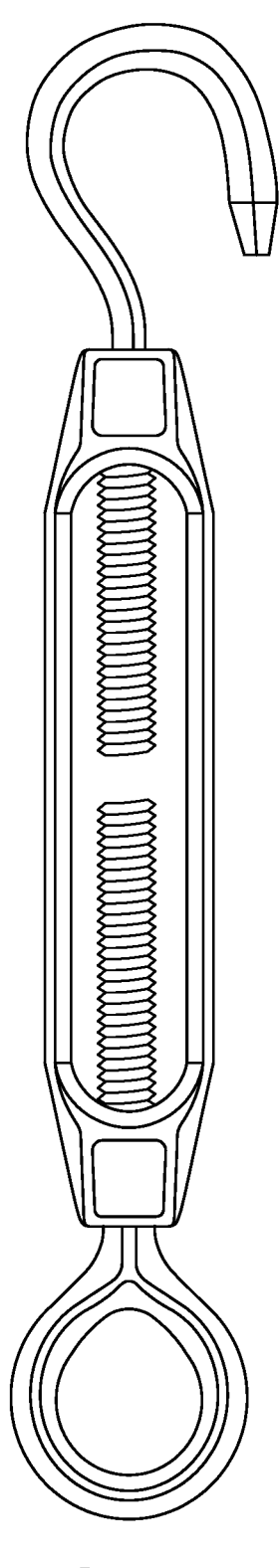
Figure 10E:
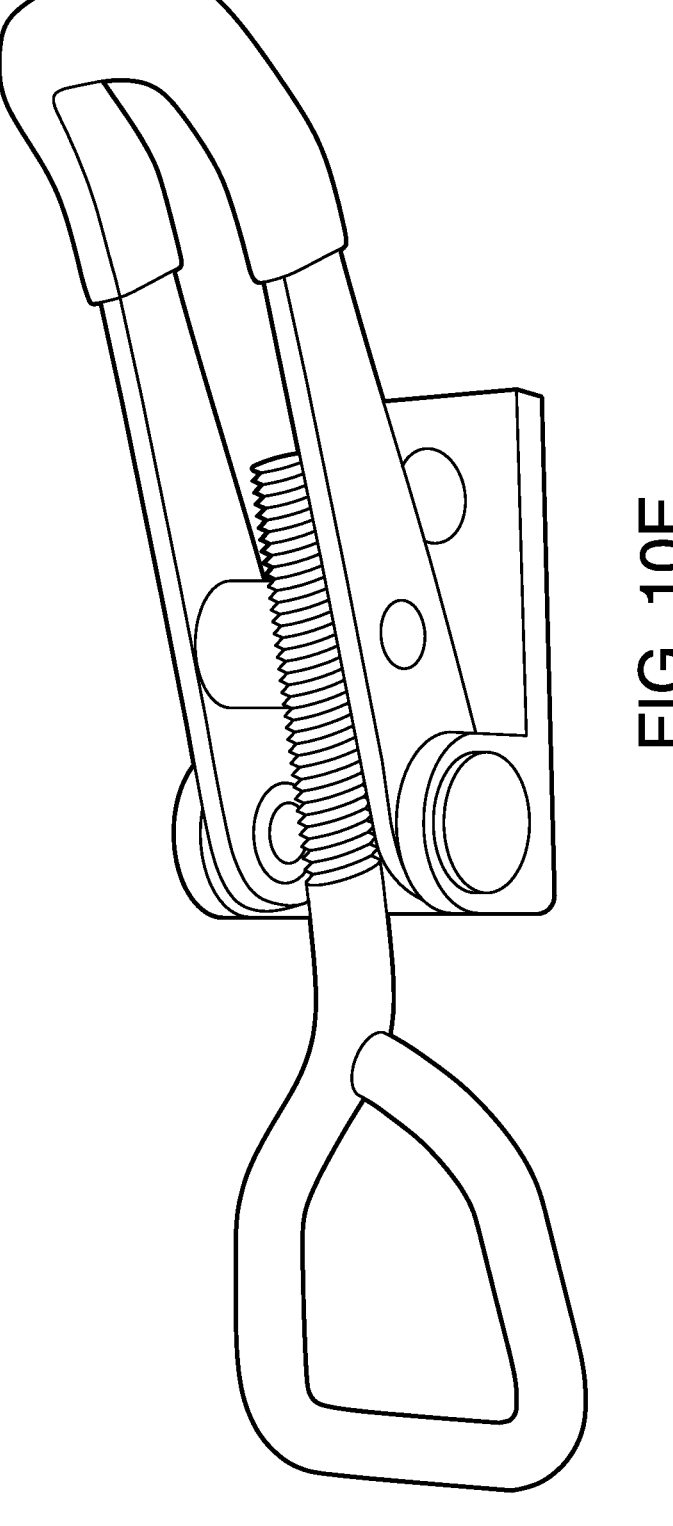

As illustrated in FIGS. 8A-8G, the frame 14 can incorporate different shapes, comprising arc, chord, "Figure-8", oval, rectangle, polygon, circle, ellipse, and/or combination shapes. The distance between opposite sides of the frame 14 is an important design factor to control the deflection of the mesh layer 12. Longer distances result in greater deflection. The deflection of the flexible planar layer 12 can also be controlled by the type, number, distribution and tension of the ligatures 16. As illustrated in FIGS. 9A-9E, the frame 14 may also have a trapezoidal or other suitably shaped cross-section to increase the contact area with the surface 20, thereby further distributing the remaining kinetic energy and force and reducing sound and vibration transmission.

Figure 2:
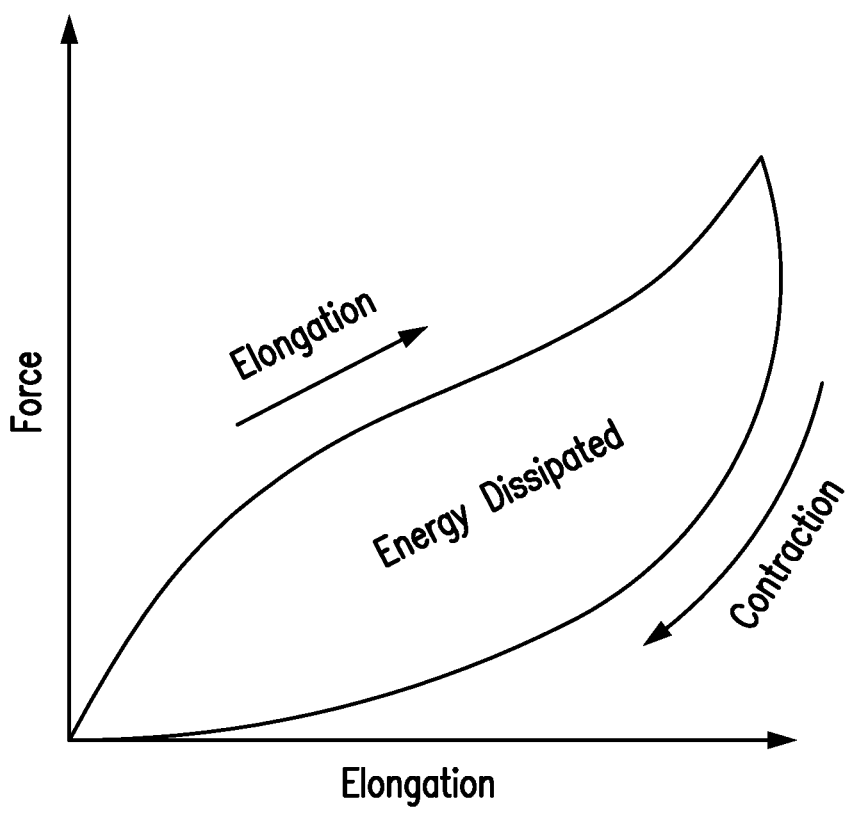
FIG. 2 is a schematic of a force-elongation curve for an energy dissipating viscoelastic ligature.
Figure 3A:
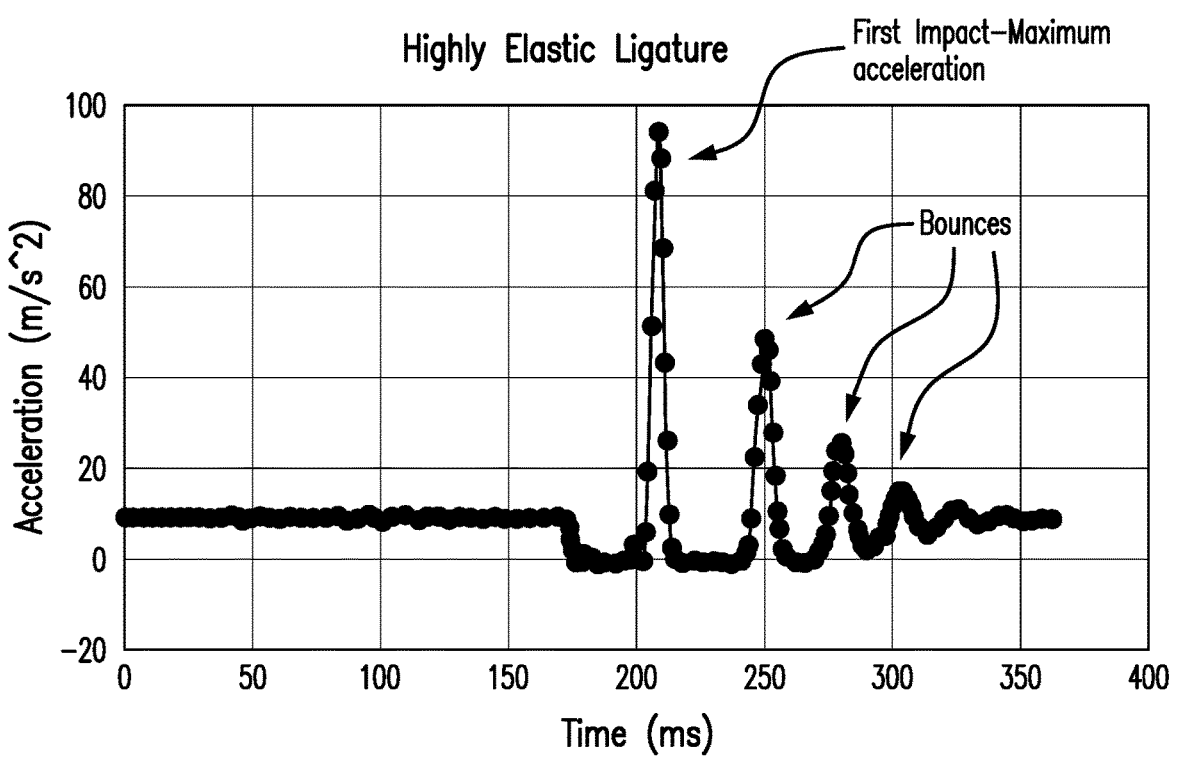
FIG. 3 is acceleration data for a fully elastic and a viscoelastic ligature during dynamic impact tensile elongation.
Figure 3B:
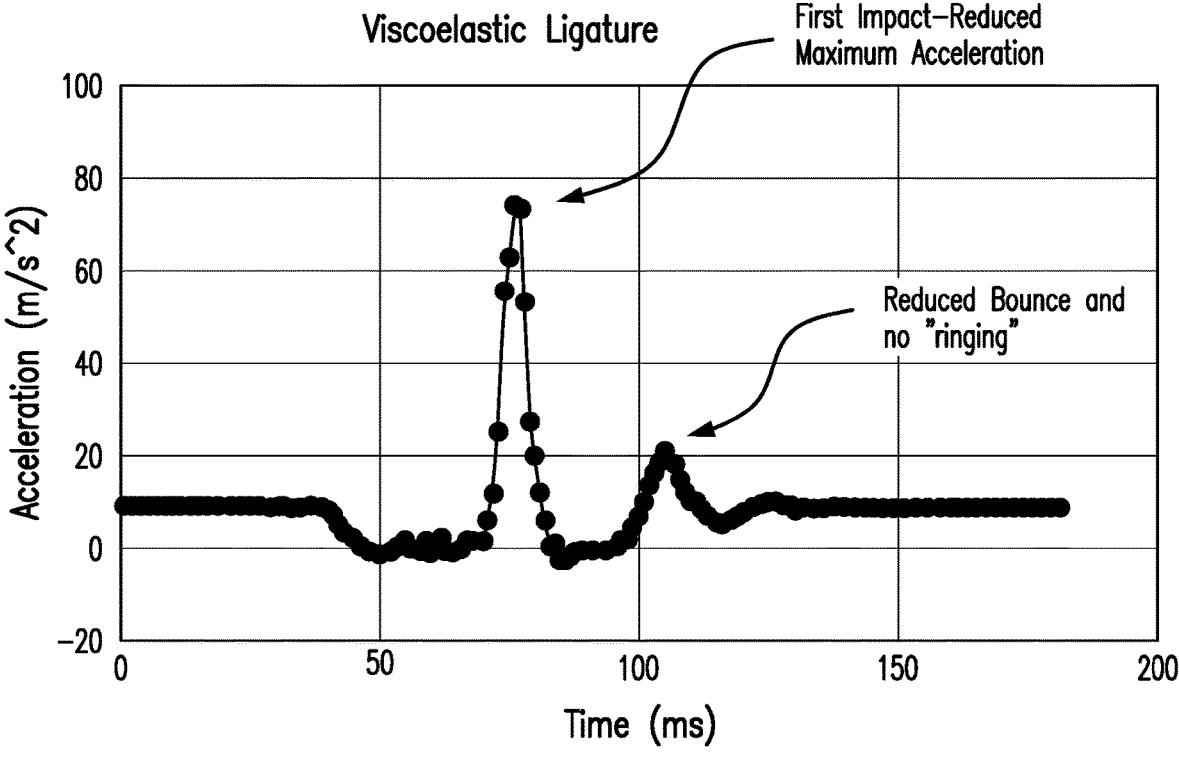
Figure 4:
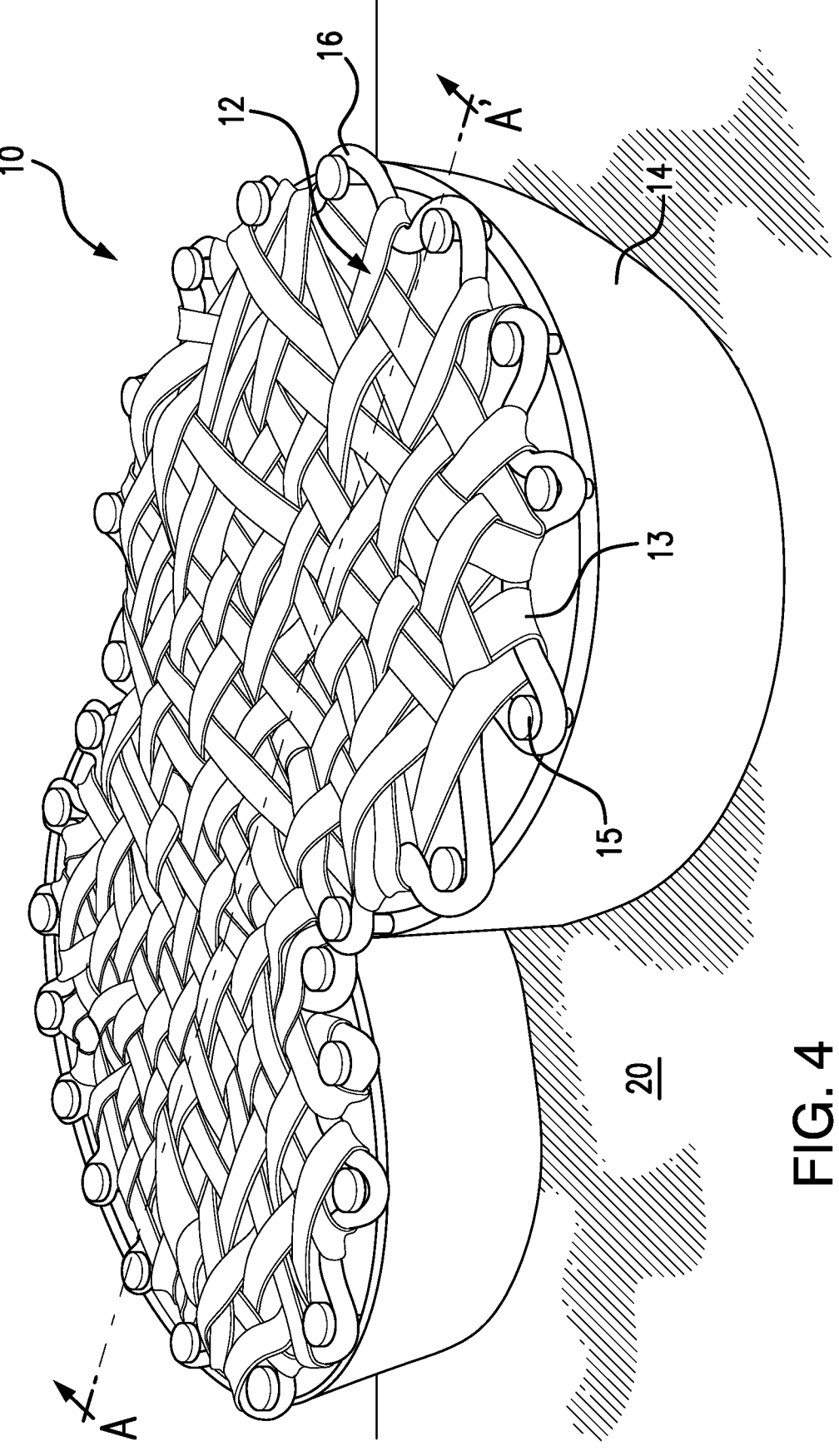
FIG. 4 is a perspective view of an embodiment of the device for reduced impact force and reduced sound and vibration transmission.
Figure 5:
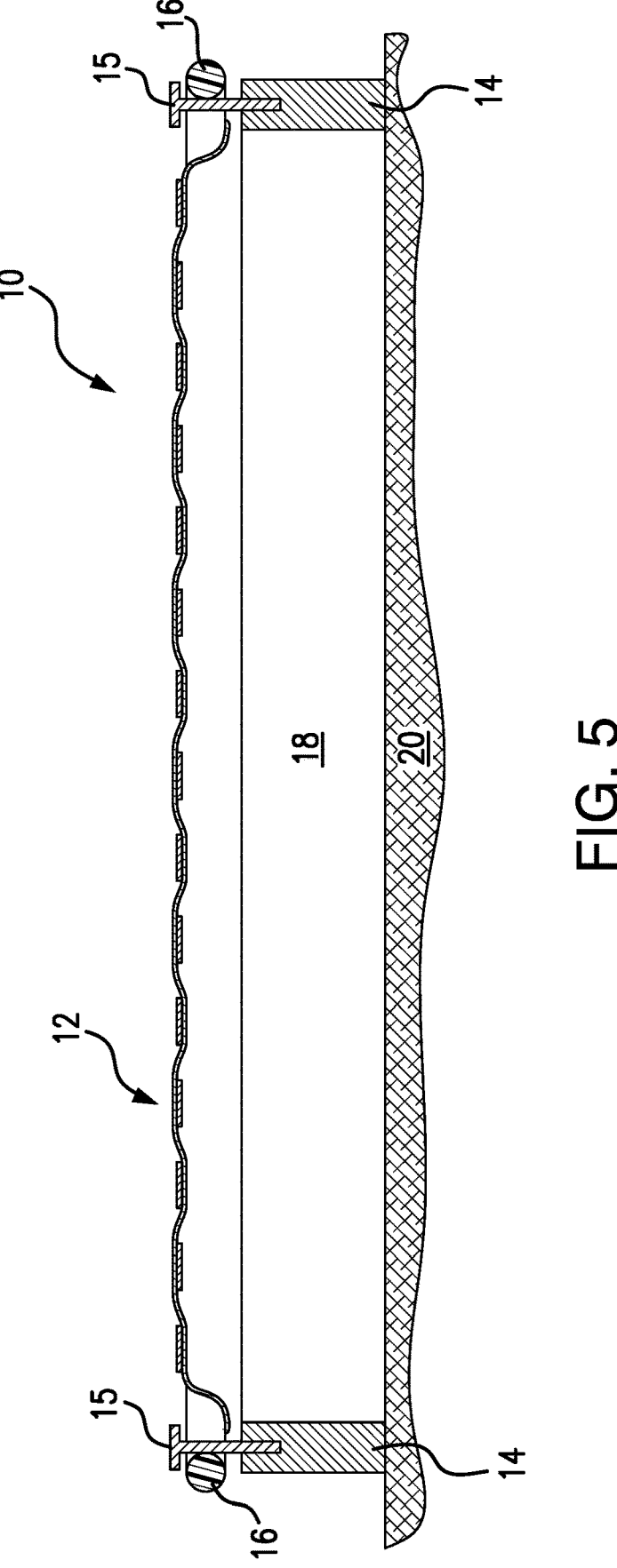
FIG. 5 is a cross-sectional view of the device in FIG. 4, along the line A-A', showing the void space and the frame with a rectangular cross-section.
Figure 6:
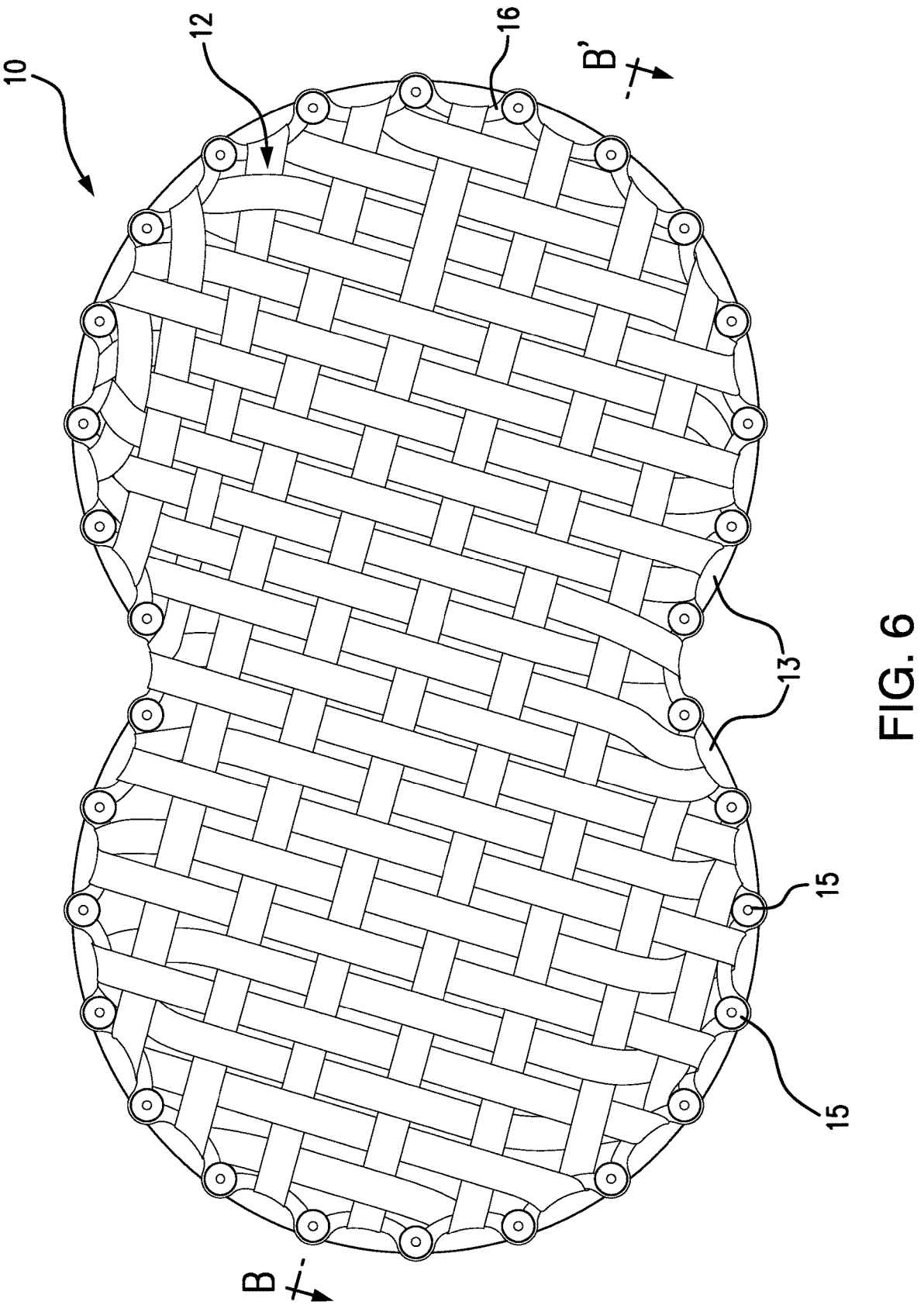
FIG. 6 is a top plan view of the device in FIG. 4, showing the frame in a Figure-8 shape.

An example embodiment of the device 10 is illustrated in FIGS. 1-3. The "figure-8" frame 14 shape reduces both the distance between the opposing sides of the frame 14 and allows a greater radial distribution of the impact force to deform more ligatures 16. In designing the frame, the maximum magnitude of the deflection of the weight and mesh layer 12 scales non-linearly with the distance between opposing sides of the frame. Doubling the distance results in an increase in the deflection more than simply double. For example, in the case of linear-elastic materials and small deflections, the maximum deflection of a simply supported beam with uniform loading scales with the beam length to the fourth power. Doubling the length results in a maximum deflection eight times greater. For non-linear materials, such as rubber, and large deformations, the maximum deformation is expected to be even larger than the linear-elastic case as a function of the length. Therefore, shorter distances between opposing sides of the frame 14 is a powerful design variable to more easily prevent the weight and mesh layer 12 from impacting the surface 20 directly for the same number, distribution, and tension of energy absorbing and dissipating elements 12.

The mesh layer 12 in this embodiment is a single layer of woven nylon webbing material. The woven nylon webbing was demonstrated to reduce the rebound or bounce of the weight, compared to, for example, woven polypropylene rope, due possibly to both the more rigid structure of the woven nylon webbing causing more of the ligatures 16 to be elongated and the increased frictional interaction between the nylon webs contributing to the energy dissipation.

The mesh layer 12 in this embodiment is attached to the frame 14 by using a continuous braided paraffin-treated butyl rubber ligature 16. The paraffin treated butyl rubber was used because of its noted excellent energy absorption and dissipation properties and a braid was used to increase the friction between the braided rubber strands and add to the energy dissipation and reduction of the rebound or bounce of the weight. The energy ligature 16 is woven into the ends of the nylon webbing and attached to the frame 12 by looping around multiple bolt-like protrusions 15 mounted into the frame 12.

The void space 18 between the mesh layer 12 and the surface 20 allows for the falling weight or thrown weight to decelerate over a greater distance and time, thereby reducing the total force applied to the frame 14 and the surface 20. The reduced force results in reduced sound and vibration transmitted to the surface 20.

In operation, the falling or thrown weight contacts and deflects the mesh layer 12, causing the ligatures 16 to elongate in tension and absorb and dissipate a portion of the kinetic energy of the weight. Also, the friction between the deforming elements of the mesh layer 12 contributes to the kinetic energy dissipation. The remaining kinetic energy is transferred to the frame 14. The void-space 18 allows the falling weight to decelerate over a greater distance and time, thereby reducing the total kinetic energy and dynamic force applied to the frame and the supporting surface 20 on which the frame rests. The frame 14 contact area is large, distributing the reduced impact force over a greater physical contact area, contributing to greatly reduced sound transmission. The device prevents the weight and supporting mesh layer 12 from directly contacting the supporting surface 20. The impact energy is dissipated through the extension and contraction of the ligatures 16 resulting in reduced bounce of the weight.

The device 10 is suitable for use in various environments requiring reduced impact force and sound and vibration transmission, such as home gyms, commercial gyms, and fitness settings as well as other environments where impact is present. The device 10 can be used for weightlifting with dumbbells, kettle bells, and barbells, wall-mounted impactors, CrossFit, or high-intensity interval training (HIIT) exercises that may involve dropping or throwing weights.

The invention provides several advantages over conventional gym mats, including more effective reduction of impact force and sound and vibration transmission, reduced bounce of weights upon impact, improved user safety, and reduced damage to floors, foundations, and walls.

In conclusion, the present invention provides a device for absorbing and dissipating the energy of a dropped or thrown object and reducing impact force and sound and vibration transmission. The device includes a mesh layer 12, energy-absorbing and dissipating ligatures 16, a frame 14, and a void space 18 between the frame 14 and the surface 20 on which the frame 14 rests, for example a floor, foundation, or wall. The mesh layer 12 is connected to a frame by energy absorbing and dissipating ligatures 16, and the void space 20 allows the falling weight to decelerate over a greater distance and time, thereby reducing the total force applied to the frame 14 and the surface 20 on which the frame 14 rests. The invention provides improved sound and vibration transmission reduction, increased user safety, and reduced damage to floors, foundations, and walls.

Although the preferred embodiments of the present invention have been disclosed for illustrative purposes, those skilled in the art will appreciate that many additions, modifications and substitutions are possible, without departing from the scope and spirit of the present invention as defined by the accompanying claims.

What is claimed is:

1. A device for dissipating an initial impact energy and reducing an initial impact force of a moving object, the device comprising:

a rigid frame, supported by a horizontal or vertical supporting structure, wherein the frame surrounds and defines a frame interior void, and wherein the frame has a frame base, multiple frame sides, and an open frame top, and wherein the frame has a frame length, a frame width and a frame depth, and wherein the frame top and/or the frame sides contain multiple perimeter connectors;

at least one flexible, planar, mesh layer, wherein the mesh layer comprises interlaced webbing, and wherein the mesh layer has a mesh perimeter, and wherein the mesh perimeter is connected to the perimeter connectors by one or more viscoelastic ligatures;

wherein, upon the moving object imparting the initial impact force to the mesh layer, the mesh layer undergoes a mesh layer deflection into the interior void through an impact distance and an impact time, such that the mesh layer deflection is operative to extend the impact distance and the impact time, thereby reducing the initial impact force to a lesser resultant impact force imparted to the supporting structure;

wherein, upon the moving object imparting the initial impact force to the mesh layer, the viscoelastic ligatures cooperatively and concurrently undergo a viscoelastic elongation, whereby the ligatures are operative to transfer a first impact kinetic energy component of the initial impact energy to the frame, and to dissipate viscously a second impact kinetic energy component of the initial impact energy, and to store a first elastic strain potential energy component;

wherein, in the course of the mesh layer deflection, the mesh layer is stretched, such that an internal mesh deformation friction dissipates a third kinetic energy component of the initial impact energy, while a mesh elasticity stores a second elastic strain potential energy component; and wherein, during a rebound of the moving object after reaching the impact distance, the conversion of the first elastic strain potential energy component to a first rebound kinetic energy component is damped by a viscous relaxation of the viscoelastic ligatures, and the conversion of the second elastic strain potential energy component to a second rebound kinetic energy component is damped by an internal mesh recovery friction of the mesh layer, such that a height and a number of rebounds of the moving object is diminished.

2. The device according to claim 1, wherein the frame is comprised of one or more interconnected frame sections having sectional shapes comprising arcs, chords, semi-circles, semi-ovals, semi-ellipses, figures-8, circles, ovals, ellipses and/or polygons, and wherein the frame has a frame cross-section that is rectangular, trapezoidal or semi-trapezoidal in shape.

3. The device according to claim 2, wherein a frictional interaction between the interlaced webbing of the mesh layer increases the internal mesh deformation friction and the internal mesh recovery friction of the mesh layer.

4. The device according to claim 3, wherein the viscoelastic ligatures comprise one or more continuous or semi-continuous, looped, unbraided or braided strands of a rubber or plastic elastomer.

5. The device according to claim 4, wherein the perimeter connectors comprise bolts, screws, rivets, hooks, rings, eyelets, grommets, clamps, snaps, and/or hook-and-loop straps, or wherein the perimeter connectors comprise apertures, notches, grooves, channels, flanges and/or protrusions of the frame.

6. The device according to claim 5, wherein the perimeter connectors are extendable and/or rotatable, so as to adjust a tension of the ligatures in relation to the initial impact force of the moving object.

7. The device according to claim 2, wherein the frame length, the frame width, the frame depth, the frame shape and the frame cross-section are correlated to the initial impact force of the moving object.

8. The device according to claim 4, wherein the viscoelastic ligatures are made of paraffin-infused butyl rubber.

9. The device according to claim 3, wherein the webbing is made of paraffin-infused butyl rubber.

* * * * *